(12) United States Patent
Vendetti

(10) Patent No.: US 7,811,024 B2
(45) Date of Patent: Oct. 12, 2010

(54) DOVETAIL ALIGNMENT AND LOCKING SYSTEM

(75) Inventor: Vincent J. Vendetti, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1155 days.

(21) Appl. No.: 11/250,699

(22) Filed: Sep. 20, 2005

(65) Prior Publication Data

US 2006/0233605 A1 Oct. 19, 2006

Related U.S. Application Data

(60) Provisional application No. 60/648,503, filed on Jan. 28, 2005.

(51) Int. Cl.
*B23Q 1/48* (2006.01)

(52) U.S. Cl. .......................... 403/381; 42/127; 411/418

(58) Field of Classification Search ................. 403/325, 403/326, 348, 349, 381; 411/418, 551; 42/124, 42/127

See application file for complete search history.

(56) References Cited

U.S. PATENT DOCUMENTS

| 927,988 | A | * | 7/1909 | Massey ....................... 269/186 |
| 2,992,531 | A | * | 7/1961 | Hershey ...................... 60/742 |
| 3,611,606 | A | * | 10/1971 | Sefried et al. ................. 42/124 |
| 4,062,256 | A | | 12/1977 | Newman, Sr. et al. .......... 82/17 |
| 4,438,911 | A | * | 3/1984 | McDougal .................... 269/32 |
| 4,570,887 | A | | 2/1986 | Banister ..................... 248/187 |
| 4,650,256 | A | | 3/1987 | Wetzinger .................... 299/92 |
| 4,817,402 | A | | 4/1989 | Leiding ........................ 70/58 |
| 4,835,895 | A | * | 6/1989 | Bowen ........................ 42/127 |
| 5,467,552 | A | | 11/1995 | Cupp et al. ................... 42/100 |
| 5,787,630 | A | * | 8/1998 | Martel ......................... 42/125 |
| 6,176,641 | B1 | | 1/2001 | Schenk ........................ 403/381 |
| 6,922,934 | B1 | * | 8/2005 | Huan .......................... 42/127 |
| 2003/0175075 | A1 | | 9/2003 | Garrison ...................... 403/381 |
| 2003/0205903 | A1 | * | 11/2003 | Kelley et al. ................. 292/241 |
| 2004/0200150 | A1 | * | 10/2004 | Kelley et al. ................. 49/185 |

* cited by examiner

*Primary Examiner*—Joshua T Kennedy
(74) *Attorney, Agent, or Firm*—Gerhard W. Thielman, Esq.

(57) ABSTRACT

An alignment and locking system includes a dovetailed male portion having partial female threads formed in a surface thereof, a housing having a dovetailed notch for slidingly receiving the male portion, and a screw assembly coupled to the housing. The screw assembly includes a rotatable rod having a threaded region that partially extends into the housing's notch. The threaded region includes a partially threaded portion and a fully threaded portion. The partially threaded portion is defined by (i) a first region that cannot engage the partial female threads of the male portion as it slides in the notch, and (ii) a second region that can engage the partial female threads of the male portion as it slides in the notch. The system is further configured to impart a biased rotational movement to the rod to align the first region of the partially threaded portion with the notch when the male portion is not engaged in the notch.

15 Claims, 3 Drawing Sheets

DOVETAIL ALIGNMENT AND LOCKING SYSTEM

CROSS REFERENCE TO RELATED APPLICATION

Pursuant to 35 U.S.C. §119, the benefit of priority from provisional application 60/648,503, with a filing date of Jan. 28, 2005, is claimed for this non-provisional application.

STATEMENT REGARDING FEDERALLY SPONSORED RESEARCH AND DEVELOPMENT

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to alignment/locking systems, and more particularly to a dovetail-based system for aligning and locking two parts together.

BACKGROUND

Firearms frequently require a variety of precision instruments (e.g., scopes, laser range finders, etc.) to be repeatedly attached to and detached from the firearm. Bracket systems used in these applications typically require the tightening/loosening of multiple screws or utilize some form of a "snap" fit that requires a certain degree of impact force to be used in the attachment and/or detachment process. As a result, the attachment/detachment process can be slow, tedious, cause misalignment of the precision instrument during the attachment thereof, and/or cause damage to the precision instrument being attached/detached.

SUMMARY

The present invention provides a bracket system that aligns and locks two parts thereof together, and provides a bracket system that can be used to align and lock a precision instrument in place.

Other aspects of the present invention will become more obvious hereinafter in the specification and drawings.

In accordance with the present invention, an alignment and locking system is provided. A male portion dovetailed in at least one dimension has partial female threads formed in a surface thereof. A housing has a female dovetailed notch formed therein for slidingly receiving the male portion such that a wedge fit is formed therebetween when the notch is nearly fully engaged by the male portion. A screw assembly coupled to the housing includes a rotatable rod having a threaded region that partially extends into the notch. The threaded region includes a partially threaded portion and a fully threaded portion with the partially threaded portion being encountered by the male portion before the fully threaded portion as the male portion is slid into the notch. The partially threaded portion is defined by (i) a first region that cannot engage the partial female threads of the male portion as it slides in the notch, and (ii) a second region that can engage the partial female threads of the male portion as it slides in the notch. The second region and fully threaded portion are defined by screw threads capable of corresponding engagement with the partial female threads formed on the male portion. Means are provided to apply a rotational bias to the rod in order to align the first region of the partially threaded portion with the notch when the male portion is not engaged in the notch.

DETAILED DESCRIPTION

Figure 1:
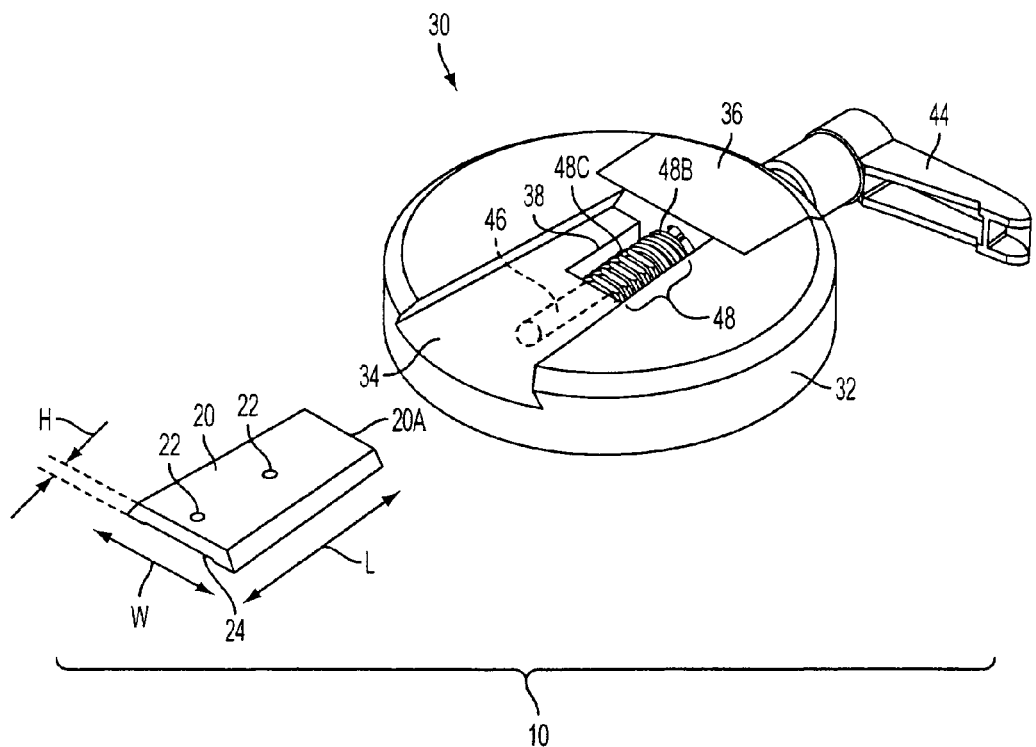
FIG. 1 is a perspective view of an exemplary implementation of a dovetail alignment and locking system prior to the joining of the dovetail plate to the housing.

Referring now to the drawings, and more particularly to FIG. 1, an embodiment of the dovetail alignment and locking system (or "A/L system" as it will be referred to hereinafter) according to the present invention is shown and is referenced generally by numeral 10. A/L system 10 can be used in a variety of applications to provide for the repeated mating of elements (not shown) coupled to A/L system 10. The present invention is particularly useful when a delicate and/or precision instrument must be mounted to a support platform as is the case when precision optical or electronic instruments must be mounted to a firearm for purposes of ranging, aiming, reconnaissance, etc. However, it is to be understood that A/L system 10 is not limited to use for such applications.

Figure 2:
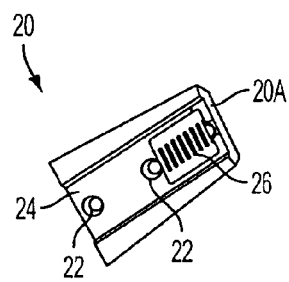
FIG. 2 is an isolated plan view of the underside of the dovetail plate of FIG. 1.

A/L system 10 includes a rigid dovetail plate 20 and a housing assembly 30 that will be mounted on a platform (not shown). An element or instrument (not shown) that is to be coupled to housing assembly 30 is mounted to dovetail plate using, for example, mounting holes 22 provided on/through dovetail plate 20. The position and number of mounting holes 22 is not a limitation of the present invention. Further, other mounting arrangements could be utilized without departing from the scope of the present invention. Still further, mounting plate 20 could be made as an integral part of the element or instrument that is to be coupled to housing assembly 30. Dovetail plate 20 is "dovetailed" in width W along its length L and thickness or height H dimensions. Referring additionally to FIG. 2, the underside of dovetail plate 20 is notched at a region 24 along the length thereof.

A series of partial female or interior threads 26 are formed along notched region 24 beginning at the tapered or leading edge 20A of dovetail plate 20.

Housing assembly 30 includes a rigid housing body 32 adapted to be mounted to a platform (not shown). The type of mounting and/or platform to which housing body 32 is mounted are not limitations of the present invention. It is to be further understood that the shape of housing body 32 could be other than that shown without departing from the scope of the present invention.

Housing body 32 has a dovetailed notch 34 formed in a surface thereof that extends to a housing block 36 fitted in and coupled to housing body 32. In general, dovetail notch 34 is sized/shaped to correspond to dovetail plate 20 such that dovetail plate 20 can achieve a wedge fit within dovetailed notch 34 as plate 20 slides into and engages notch 34. More specifically, dovetailed notch 34 is sized/shaped such that its leading edge 34A provides for the passage of leading edge 20A and most or all of dovetail plate 20 until plate 20 wedges into notch 34 where the wedge fit between plate 20 and notch 34 is achieved before leading edge 20A can contact housing block 36. This assures full contact along all portions of the dovetailed edges.

A hole or recess 38 is also formed in housing body 32 adjacent housing block 36 to house the threaded region of a screw assembly. More specifically, housing assembly 30 includes a screw assembly 40 shown in isolation in FIGS. 3A and 3B. Screw assembly 40 includes housing block 36 that will be fitted in and coupled to housing body 32 (FIG. 1). It is to be understood that while housing block 36 facilitates assembly of the illustrated embodiment, its use is not a limitation of the present invention as other constructions could be used to achieve the functions of the present invention without departing from the scope thereof.

Passing through and rotatably supported in housing block 36 is a rigid rod 42 having a handle 44 mounted onto (or integrated with) one end thereof. Handle 44 is accessible to a user on the exterior of housing body 32 (FIG. 1) and is used to bring about the rotation of rod 42 about its axis 42A. The other end 46 of rod 42 forms a dowel that is rotatably supported within housing block 32 (FIG. 1). Rod 42 includes a region designated by numeral 48. In general, region 48 includes a modified or partially threaded portion 48A and a fully threaded portion 48B. While a variety of thread designs can be used in the present invention, ACME-type threads are generally preferred owing to their strength and because it is easy to clean debris from between the threads thereof.

Figure 4:
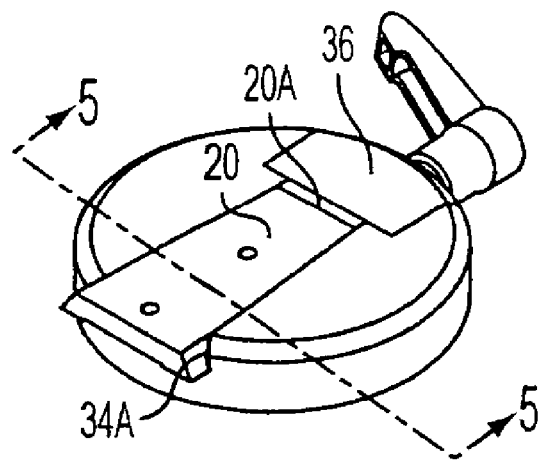
FIG. 4 is a perspective view of the dovetail alignment and locking system of FIG. 1 after the dovetail plate has been drawn into and locked to the housing.
Figure 5:
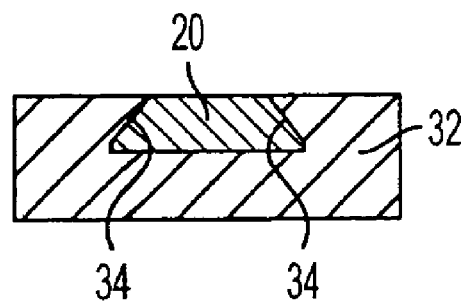
FIG. 5 is a cross-sectional view of the dovetail plate and housing taken along line 5-5 in FIG. 4.

Partially threaded portion 48A is threaded just like fully threaded portion 48B except that partially threaded portion 48A includes a section 48C that is defined by reduced thread depth/height or a flat (as shown). In general, section 48C is shaped such that when section 48C is positioned at the opening of recess 38 (as shown in FIG. 1), section 48C will allow threads 26 on the underside of dovetail plate 20 to pass thereover as dovetail plate 20 is slid in dovetailed notch 34 towards housing block 36. This free, unobstructed movement of dovetail plate 20 continues until threads 26 encounter fully threaded portion 48B. At this point, as rod 42 is rotated about its axis 42A (e.g., clockwise as indicated by arrow 100), dovetail plate 20 is drawn deeper into notch 34 as fully threaded portion 48B engages threads 26 of dovetail plate 20. Eventually, the reduced thread depth or flat section 48C rotates away from the opening of recess 38 until all threads of region 48 engage threads 26. Continued rotation of rod 42 draws plate 20 towards housing block 36 until plate 20 is fully wedged in dovetailed notch 34 as illustrated in FIGS. 4 and 5. This dovetailed wedge fit aligns and locks plate 20 to housing body 32. To release/remove dovetail plate 20, rod 42 is simply rotated in the opposite direction.

Figure 3A:
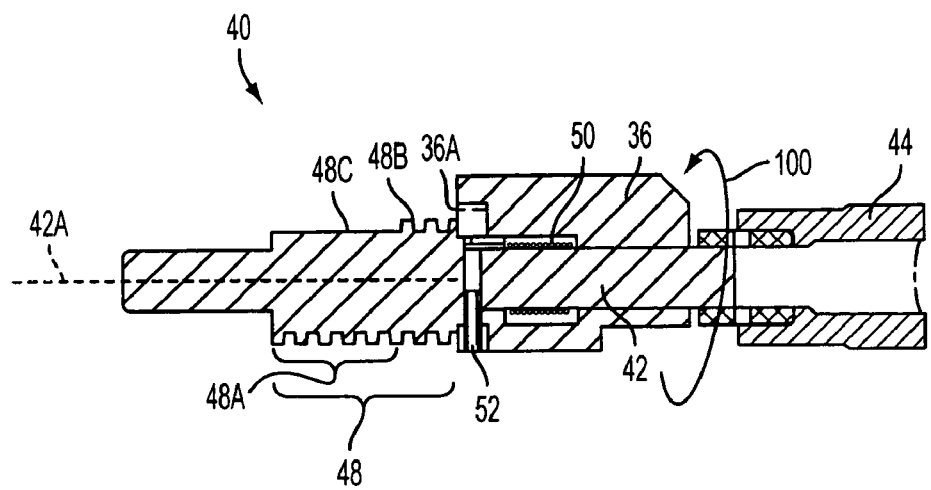
FIG. 3A is a cross-sectional view of the screw assembly of FIG. 1.
Figure 3B:
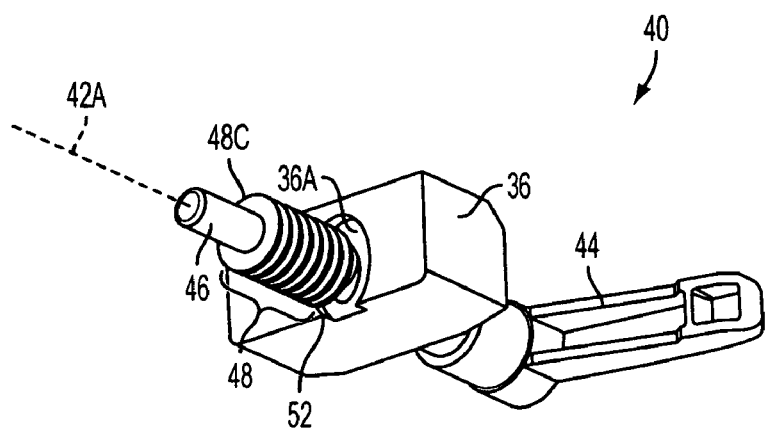
FIG. 3B is a perspective view from the underside of the screw assembly of FIG. 1.

Prior to the coupling of dovetail plate 20 to housing body 32 and when dovetail plate 20 is to be removed from housing body 32, the reduced depth or flat section 48C of partially threaded portion 48A must be positioned at the opening of recess 38. To assure this, a biasing torsion spring 50 can be disposed between rod 42 and housing block 36, and a stop pin 52 can be coupled to and extend radially from rod 42. Torsion spring 50 rotatably biases rod 42 such that stop pin 52 engages housing block 36 (FIG. 3B) thereby properly positioning section 48C of region 48 in recess 38 to receive or release dovetail plate 20. Upon rotation of rod 42 (i.e., to draw in dovetail plate 20), stop pin 52 is free to move in a correspondingly-sized slot 36A formed in housing block 36 as best seen in FIG. 3B. The friction force created by the wedge fit between dovetail plate 20 and housing body 32 is greater than the biasing force of spring 50. Thus, the wedge fit serves to lock dovetail plate 20 and housing body 32 together until rod 42 is rotated in a direction that is opposite to that of direction 100 (FIG. 3A).

The advantages of the present invention are numerous. The A/L system provides for the repeated alignment and locking of two parts. The unique threaded coupling between the dovetail plate and screw assembly assures that the two parts are drawn together gently but securely. Thus, attachment/detachment of parts is simple and quick while maintaining the integrity of the parts being drawn together.

Although the invention has been described relative to a specific embodiment thereof, there are numerous variations and modifications that will be readily apparent to those skilled in the art in light of the above teachings. It is therefore to be understood that the invention may be practiced other than as specifically described.

What is claimed as new and desired to be secured by Letters Patent of the United States is:

1. An alignment and locking system, comprising:
    a male portion dovetailed in at least one dimension thereof, said male portion having partial female threads formed in a surface thereof;
    a housing having a female dovetailed notch formed therein for slidingly receiving said male portion wherein a wedge fit is formed therebetween when said notch is nearly fully engaged by said male portion;
    a screw assembly coupled to said housing, said screw assembly including a rotatable rod having a threaded region that partially extends into said notch, said threaded region including a partially threaded portion and a fully threaded portion with said partially threaded portion being encountered by said male portion before said fully threaded portion as said male portion is slid into said notch, said partially threaded portion defined by (i) a first region that cannot engage said partial female threads of said male portion as said male portion slides in said notch, and (ii) a second region that can engage said partial female threads of said male portion as said male portion slides in said notch, said second region and said fully threaded portion being defined by screw threads for corresponding engagement with said partial female threads; and
    means for biasing rotational movement of said rod to align said first region of said partially threaded portion with said notch when said male portion is not engaged in said notch.

2. An alignment and locking system as in claim 1 wherein said male portion comprises a plate having length, width and thickness dimensions.

3. An alignment and locking system as in claim 2 wherein said plate is dovetailed in two of said dimensions.

4. An alignment and locking system as in claim 3 wherein said plate is dovetailed along said length and said thickness dimensions.

5. An alignment and locking system as in claim 1 wherein said screw threads and said partial female threads comprise ACME-type threads.

6. An alignment and locking system as in claim 1 further comprising a handle coupled to said rod and adapted to be grasped by a user when said rod is to be rotated.

7. An alignment and locking system, comprising:
    a male portion dovetailed in at least one dimension thereof, said male portion having partial female threads formed in a surface thereof;

a housing having a female dovetailed notch formed therein for slidingly receiving said male portion wherein a wedge fit is formed therebetween when said notch is nearly fully engaged by said male portion;

a screw assembly coupled to said housing, said screw assembly comprising (i) a block with a bore formed therethrough, (ii) a rod extending through said bore and rotatably supported therein with first and second portions of said rod extending from opposite ends of said block, (iii) a handle coupled to said first portion of said rod, and (iv) a threaded region formed on said second portion of said rod with said threaded region partially extending into said notch, said threaded region including a partially threaded portion and a fully threaded portion with said partially threaded portion being encountered by said male portion before said fully threaded portion as said male portion is slid into said notch, said partially threaded portion defined by (i) a first region that cannot engage said partial female threads of said male portion as said male portion slides in said notch, and (ii) a second region that can engage said partial female threads of said male portion as said male portion slides in said notch, said second region and said fully threaded portion being defined by screw threads for corresponding engagement with said partial female threads; and means for biasing rotational movement of said rod to align said first region of said partially threaded portion with said notch when said male portion is not engaged in said notch; wherein said handle is adaptable for grasping by a user when said rod is to be rotated, and said rod is rotated in response to said handle being rotated.

8. An alignment and locking system as in claim 7 wherein said male portion comprises a plate having length, width and thickness dimensions.

9. An alignment and locking system as in claim 8 wherein said plate is dovetailed in two of said dimensions.

10. An alignment and locking system as in claim 9 wherein said plate is dovetailed along said length and said thickness dimensions.

11. An alignment and locking system as in claim 7 wherein said screw threads and said partial female threads comprise ACME-type threads.

12. An alignment and locking system as in claim 7 wherein said biasing means comprises:

a spring disposed about said rod within said block for applying a rotational spring force to said rod; and stop means coupled to said rod and cooperating with said block to limit rotational movement of said rod caused by said rotational spring force wherein said rod is rotatably positioned to align said first region of said partially threaded portion with said notch when said male portion is not engaged in said notch.

13. An alignment and locking system, comprising:

a plate having length, width and thickness dimensions, said plate being dovetailed in said length and thickness dimensions, said plate having partial female threads formed in and along a surface thereof defined by said length and width dimensions;

a housing having a female dovetailed notch formed therein for slidingly receiving said plate wherein a wedge fit is formed therebetween when said notch is nearly fully engaged by said plate;

a screw assembly coupled to said housing, said screw assembly including a rotatable rod having a threaded region that partially extends into said notch, said threaded region including a partially threaded portion and a fully threaded portion with said partially threaded portion being encountered by said plate before said fully threaded portion as said plate is slid into said notch, said partially threaded portion defined by (i) a first region that cannot engage said partial female threads of said plate as said plate slides in said notch wherein said plate is free to slide in said notch until said partial female threads encounter said fully threaded portion of said rod, and (ii) a second region that can engage said partial female threads of said plate as said plate slides in said notch, said second region and said fully threaded portion being defined by screw threads for corresponding engagement with said partial female threads; and means for biasing rotational movement of said rod to align said first region of said partially threaded portion with said notch when said plate is not engaged in said notch wherein, when said rod is rotated after said partial female threads have encountered said fully threaded portion of said rod, said second region and said fully threaded portion engage said partial female threads to pull said plate into a dovetailed engagement with said notch.

14. An alignment and locking system as in claim 13 further comprising a handle coupled to said rod and adapted to be grasped by a user when said rod is to be rotated.

15. An alignment and locking system as in claim 13 wherein said screw threads and said partial female threads comprise ACME-type threads.

\* \* \* \* \*